3,282,705
MONOGLYCERIDE OF FATTY ACID PREPARATION AND METHOD OF PREPARING SAME
Francis Frederick Hansen, 224 E. Poplar St., Walla Walla, Wash.
No Drawing. Filed Oct. 14, 1965, Ser. No. 496,172
9 Claims. (Cl. 99—118)

This application is for an improvement in the invention disclosed in my copending allowed application Serial No. 172,100 and is a continuation-in-part of said application, now Patent No. 3,216,829, granted May 9, 1965.

In my said copending application there is disclosed the preparation of an emulsion by mixing together at a temperature of about 200° F. equal parts by weight of a water heated to about 200° F. and monoglyceride of a fat-forming fatty acid, particularly one, the fatty acid moiety of which has from 16 to 20 carbon atoms, or which is a solid at room temperature. After mixing, the mixture is beaten with a conventional beater and more hot water, not substantially exceeding the amount first used, is beaten into the resulting emulsion that is so formed. Beating is continued as the mix cools down to close to room temperature. The resulting product is a smooth, creamy emulsion. Part or all of the water last added may be replaced by corn syrup and/or glycerine. The monoglyceride used is a distillation product and contains about 90% of monoglyceride with the balance being di- and tri-glyceride.

The emulsion or dispersion so formed has produced excellent results, substantially superior to normal monoglyceride in various food products where monoglyceride is used, and has shown particularly superior results in bread and commercial bakery products. It has been found, however, that when the emulsion is produced for commercial use, some subtle change occurs, probably in the microcrystalline structure of the monoglyceride, after long standing, apparently due to bleeding of the water and evaporation and the lumping together of the tiny particles of monoglyceride into small clusters that do not readily break down and diffuse through the dough when it is used, thereby reducing its efficiency.

I have discovered that the creamy emulsion may be substantially improved as an emulsifier or anti-staling agent for bread and baked goods by the addition of a small amount of baking soda, or its function as an antistaling agent is improved and its shelf life extended by the addition of a small percentage of hydroxylated lecithin, and by using both sodium bicarbonate and hydroxylated lecithin, unexpectedly superior utility as a so-called emulsifier is secured. At the same time there has been no observable degeneration in any batches made with hydroxylated lecithin during many months of experimental work, all such material giving evidence of substantially extended and uniform shelf life.

Incidentally, where hydroxylated lecithin is used, the total amount of water that can be introduced is extended without limit and without separation occurring. This indicates that in the original product the water was the discontinuous phase and the monoglyceride the continuous phase of the emulsion, whereas with hydroxylated lecithin, the water appears to be the continuous phase.

It may be here noted that normal lecithin as contrasted to hydroxylated lecithin does not appear to benefit the monoglyceride-water emulsion and in fact its addition to the monoglyceride-water emulsion indicates through compressometer tests on bread, that it interferes to some extent with the anti-staling quality of the fatty acid monoglyceride emulsifier. It is therefore important that commercial lecithin not be confused with hydroxylated lecithin.

With the use of hydroxylated lecithin and/or sodium bicarbonate, part of the water may be replaced by corn syrup, glycerine or both as disclosed in said copending application, the disclosure of which is incorporated herein by reference.

In my said copending application it was necessary that the water and monoglyceride be combined in two stages. In the first stage equal parts of melted monoglyceride and water were combined to form an initial gel, and then additional water was beaten into the gel, but the total water used could not exceed about two parts of water to one of monoglyceride without the water bleeding out. With the use of hydroxylated lecithin, and because of the water apparently becoming the continuous phase, all of the heated water and melted monoglyceride may be combined at one time, and as explained above, the amount of water is not critical except for practical reasons. In the first place the mere addition of water reduces the concentration of monoglyceride, and since, in baking and elsewhere, the monoglyceride must be used in effective amounts to accomplish its purpose, excess water does not benefit the baker and increases the container requirements, storage space and transportation costs. The point is that the amount of water is no longer so critical but is limited by considerations of economy. Secondly a creamy product in the form of a non-fluid paste is preferred by the baker, who supplies water in the mixing of the dough, rather than the use of a liquid that must be poured.

Also, while the two stage preparation of the emulsion is not, where hydroxylated lecithin is used, necessary, I presently prefer to follow it for practical reasons, especially if corn syrup or any ingredient which may interfere with the formation of the initial gel is used, or if bicarbonate of soda is employed.

*Example I*

Three ounces of a commercial food grade of a distilled monoglyceride of fat-forming fatty acid comprising 90% or higher of monoglyceride with the balance being diglyceride and triglyceride, and which was solid at room temperature, were melted and heated to 200° F. In a separate vessel three ounces of water was brought to a boil.

At the same time I placed five ounces of water and one ounce of hydroxylated lecithin in a double boiler. The hydroxylated lecithin was a light brown liquid slightly less viscous than normal commercial lecithin. To this was added one-eighth ounce of baking soda. Although the hydroxylated lecithin tested neutral with a litmus paper test, there was observed a very vigorous reaction with baking soda, and the hydroxylated lecithin turned in the water to a white, fluffy, foamy material, increasing its volume substantially. This reaction is not observed unless the temperature of the water and hydroxylated lecithin is at least about 150° F., but is more rapid at 175° F.

The three ounces of water which had reached a boiling point was poured into a mixing bowl that had been heated to 200° F. and the melted monoglyceride was quickly added. It was beaten with an electric beater having double beaters at 1000 r.p.m. for two minutes. Then the mixture of water, hydroxylated lecithin and bicarbonate of soda which had been heated in the double boiler to between 175° F. and 180° F. was added to the contents of the mixing bowl as mixing continued, and beating was continued until the mix had cooled to about 100° F., at which time it was a smooth, creamy paste strongly resembling cosmetic cold cream.

The hydroxylated lecithin which I used was a product sold commercially under the designation "Centrolene S"

and appears to have been made according to United States Patent 2,629,662 of February 24, 1953, and also as described in United States Patent 2,513,638 of July 4, 1950. I find that after adding the bicarbonate of soda as above described, and which makes the mixture slightly alkaline, it may be rendered acid without any change of appearance by adding sufficient lactic acid to give an acid litmus paper reaction, but I have not yet determined that there is any advantage in so doing since such a small amount of the product is used in baking that it does not change the slightly desirable acid condition of the dough.

The emulsion prepared as above described was arbitrarily designated by me as H–C–35 and was submitted only under that designation to a firm of cereal technologists for testing in a commercial bread formula with instructions to use the product in the ratio of 1.35% of the weight of the flour. This percentage was used since monoglyceride used as an emulsifier in commercial baking formula ranged between 0.5% and 1% of the weight of the flour, and my previous experimental work has indicated that when monoglyceride is dispersed in the ratio of one part monoglyceride to two parts of water, as in my said application, about 0.34% of the monoglyceride equivalent weight of the flour is adequate. In the above example, of a total weight of about twelve ounces, 25% is monoglyceride, so the use of 1.35% of the emulsion to the weight of the flour provides a monoglyceride equivalent of close to 0.34%. About 3% of shortening was used. Compressometer tests made to determine softness in the bread over a five-day period beginning three days after the bread had been baked, showed only a very small change in the softness of the bread, which was rated "excellent" and indicated that the emulsion so prepared prolonged the shelf life of the bread materially, since retention of softness is a standard method of determining the anti-staling qualities of commercially baked bread.

While the product made as described above will not mold if kept under refrigeration, a preservative is used to prevent deterioration where the product is not refrigerated. Typically this may be about 0.5% sodium or calcium propionate or about 0.1% sodium benzoate which is introduced into the mix components either before combining them or while they are being beaten.

*Example II*

The procedure of Example I was followed but no bicarbonate of soda was used. The resulting product did not possess the same whiteness that was produced with Example I, but it has good keeping qualities when stored, i.e., no bleeding of water is apparent. On baking tests similar to that described wherein the product was designated H–C–43, the bread in which it was incorporated scored "excellent" as to softness, and therefore possesses excellent anti-staling qualities.

It may be explained that compressibility is always determined by comparison with a control made from the same dough and baked at the same time, but without the emulsifier and/or with a commercial emulsifier presently used. Since bread baked one day may vary from one baked another day made by exactly the same formula, there is no empirical score, and a bread scoring 50 on the compressometer as compared to the control may actually be rated softer than one scoring 60 from another batch of dough prepared at a different time. The rate of hardening, that is, of losing compressibility, as between the first day of testing and the fifth day is the critical factor, and Examples I and II both showed excellent results as compared with the controls, but no tests were made to compare the two samples.

*Example III*

In one vessel three ounces of monoglyceride as above described was heated to 200° F. and in a second vessel three ounces of water was heated to about 200° F.

In still another vessel two ounces of natural glycerine was also heated to 200° F.

In a fourth vessel one-half ounce of hydroxylated lecithin, one-eighth ounce of bicarbonate of soda, and three and one-half ounces of water were combined and heated to 200° F.

The heated water and monoglyceride in the first two vessels were combined in a preheated mixing bowl and mixed with an electric beater at 1000 r.p.m. for three minutes, producing a white, creamy emulsion. Then as beating continued, the heated glycerine was added and beating continued at the same rate for three more minutes, after which the contents of the fourth vessel were added and beating was continued for fifteen minutes when the temperature appeared to be fairly cool. At this stage it was put into jars and capped, as with other samples.

Tests made by the same laboratory on commercial bread dough indicated the bread softness to be excellent, the average compressibility for the five-day test beginning three days after baking was 51.9 as against the control having no emulsifier of 32.8.

*Example IV*

Six ounces of water containing a pinch of benzoate of soda was prepared in one vessel; three ounces of monoglyceride as used in Example I along with one-half ounce of hydroxylated lecithin were placed in a second vessel, while five and one-half ounces of water with one-eighth ounce of sodium bicarbonate were placed in a third vessel. The contents of each vessel were separately heated to 200° F.

The contents of the first two vessels were placed in a preheated mixing bowl and beaten as in other examples for a period of two minutes. Then the water and bicarbonate of soda mixture was rapidly added and beating continued for about thirty minutes. The resulting white smooth cream was put into jars and labeled H–C–48.

A baking test was run by the same laboratory, but because of the increased volume of water, the proportion of the emulsion used in the emulsion was increased to 1.75% of the weight of the flour instead of 1.35% as in all the samples previously described. The testing laboratory indicated the softness as excellent with the average compressibility 47.5 as against the control having no emulsifier of 30.8.

This example proved that an excellent emulsifier could be produced where the hydroxylated lecithin was heated along with the melting of the monoglyceride, and that the ratio of water to monoglyceride, both in the initial mix and in the final product, could be substantially greater than the two-to-one ratio where no hydroxylated lecithin was used.

Extensive experiments have been made by me, substituting corn syrup for glycerine, with highly satisfactory results. Both glycerine and corn syrup function as humectants or modifiers and are used as a water substitute for part of the water which is last introduced into the mixer. While glycerine and corn syrup are here termed humectants and appear to add little to the emulsion when it is first made over one freshly made with only water, research involving many years of testing indicate that they function to retain some of the quality of the fresh-made emulsion over long periods of time. This I attribute to some effect which they produce in stabilizing the crystalline structure of the monoglyceride, possibly retarding transition from an alpha to a beta type crystalline structure known to take place in monoglyceride, but which in the emulsion cannot be detected by usual laboratory methods but is apparent from results obtained in the use of these substances. For this reason I prefer to call them modifiers rather than humectants, since they seem to do more than merely retain moisture.

I have also made tests using bicarbonate of soda without hydroxylated lecithin. Laboratory baking tests indicate a worthwhile improvement, although nothing as outstanding as where hydroxylated lecithin and bicarbonate of soda are combined. Bicarbonate of soda, whether used alone or with hydroxylated lecithin, should not exceed about 3% of the weight of the monoglyceride, and without hydroxylated lecithin 2% appears to be the optimum. The sodium bicarbonate must be kept at a low level, one where saponification of the glyceride will not occur, and at the maximum levels here indicated this reaction will not occur. Even as little bicarbonate as 0.1% of the weight of the monoglyceride produces a reaction with hydroxylated lecithin. When there is no hydroxylated lecithin used, the minimum amount of bicarbonate of soda which will produce a noticeable effect in preventing lumping or bleeding of the emulsion has not been determined but my experimental work indicates that some observable improvement is effected with as little as 0.5%. Where hydroxylated lecithin is used, less than about 10% of the hydroxylated lecithin to monoglyceride appears to give no significant improvement and there appears to be no advantage, and in fact a diminishing value when its weight is more than 30% of the weight of the monoglyceride.

The preferred range therefore appears to be 10% to 30% of hydroxylated lecithin to monoglyceride, and 0% to 3% of bicarbonate of soda to the weight of the monoglyceride. The water content is not critical, but for practical purposes the water or water and water substitute or modifier together should not be more than about four times the weight of the monoglyceride, since water, or water and modifier much beyond this will then be so great that the emulsion will then be a flowable liquid. The monoglyceride is the monoglyceride of an edible fat-forming fatty acid, the monoglyceride being a solid at room temperature with the fatty acid moiety having between 16 and 22 carbon atoms. Preferably monoglycerides of stearic or palmitic acid, or combinations thereof, or monoglyceride derived from lard or vegetable seeds are used. The term "monoglyceride" as used herein is the commercial terminology for distillation products having 80% or higher, usually about 90%, of monoglyceride with the balance di- and tri-glyceride. I have used monoglycerides widely available under the name "Myverol" derived both from lard and from cottonseed oil. The only hydroxylated lecithin which I have found to be commercially available in this country is Centrolene S.

In all cases the heated monoglyceride is introduced into the heated water first used and the mixture beaten to convert the initial gel into a creamy mass. The other ingredients subsequently introduced are incorporated rapidly into the first mix.

While I have mentioned the utility of my invention in regard to bread baking, this being an important method for testing the utility of monoglyceride as an emulsifier, the invention is not limited to a product for use in the baking industry, but may be used with advantage in various foods where monoglyceride is used, including confections, ice cream and margarine.

In all examples herein described and numerous others, the creamy emulsion retains its form without bleeding or slow apparent recrystallization of the monoglyceride over long periods of time which should exceed normal shelf life of a product of this nature.

In a companion application, Serial No. 496,171, filed October 14, 1965, I have described an alternative procedure in which fruit pectin is used in the emulsion to stabilize it, or to retard the adverse change in the crystalline nature of the monoglyceride which seems to take place in the aging of these monoglyceride-water emulsions. I have found that by combining fruit pectin and hydroxylated lecithin no apparent advantage is secured.

I claim:

1. A white creamy paste comprised principally of distilled monoglyceride of a fat-forming fatty acid, said monoglyceride being one which is solid at room temperature, water, and hydroxylated lecithin in the range of about 10% to about 30% of the weight of the monoglyceride, bicarbonate of soda in an amount between 0% and 3% of the weight of the monoglyceride and the water exceeds the weight of the monoglyceride and is in an amount sufficient to disperse the other constituents but insufficient to form a flowable liquid.

2. A white creamy paste as defined in claim 1 in which a modifier selected from the group consisting of glycerine, corn syrup and mixtures thereof replaces part of the water.

3. The method of making a stable emulsion of water and distilled monoglyceride of a fat-forming fatty acid, said monoglyceride being one which is a solid at room temperature, which comprises melting the monoglyceride and heating it to about 200° F., mixing it with water which has been separately heated to 200° F. and beating the resulting gel into a white creamy paste as the mixture cools characterized by introducing into the mix hydroxylated lecithin in an amount ranging between about 10% to about 30% of the weight of the monoglyceride which has also been heated to between about 175° F. and 200° F. at some stage before it has been substantially cooled, and thereafter continuing the beating until the mixture has cooled to around 100° F.

4. The method of making a stable emulsion of monoglyceride and water defined in claim 3 wherein the hydroxylated lecithin is heated along with the monoglyceride.

5. The method of making a stable emulsion as defined in claim 3 consisting principally of water and monoglyceride wherein the hydroxylated lecithin is introduced into the mix with water.

6. The method of making a stable emulsion consisting principally of water and monoglyceride as defined in claim 3 wherein equal parts of water and monoglyceride are separately heated to about 200° F., combined and beaten into a white creamy paste and before the mixture has cooled, adding additional water heated to between 175° F. and 200° F. to which has been added hydroxylated lecithin and bicarbonate of soda, the total amount of water being in the range of two to three parts of water to each part by weight of monoglyceride, and the bicarbonate of soda ranging from 0.1% to 3% of the weight of the monoglyceride.

7. The method of making a stable emulsion consisting principally of water and monoglyceride as defined in claim 3, wherein water and monoglyceride are separately heated to 200° F., then combined and beaten until a white creamy emulsion has formed, then adding to the mix while the beating is continued a modifier selected from the group consisting of glycerine and corn syrup and mixtures thereof, which has been heated to about 200° F., the weight of the modifier ranging from a weight equal to the weight of water first used to a weight down to about one-third the weight of said water, and then, as the beating continues, adding additional water combined with hydroxylated lecithin and bicarbonate of soda heated to at least 175° F., the bicarbonate of soda ranging from 0% to about 3% of the weight of the monoglyceride and the additional water being sufficient to produce a soft creamy paste but insufficient to form the emulsion into a flowable liquid.

8. The method of making a stable emulsion consisting principally of a monoglyceride of an edible fat-forming fatty acid, said monoglyceride being a solid at room temperature which comprises separately heating equal parts of water and monoglyceride to about 200° F., combining them and beating the gel which forms into a creamy mass, and while the beating continues and before substantial cooling of the mass occurs, adding more water heated to about 200° F. in which is dissolved sodium bicarbonate in the ratio between 0.5% and 2% of the weight of the monoglyceride and the weight of water is about equal to the weight of water first used.

9. The method defined in claim 8 wherein the water having sodium bicarbonate therein is added in addition to a modifier heated to about 200° F., the modifier being selected from the group consisting of glycerine, corn syrup and mixtures thereof, the total water used being greater than the weight of any other ingredient and the modifier having a weight not substantially exceeding the weight of the monoglyceride, but less than the total water in the emulsion.

References Cited by the Examiner
UNITED STATES PATENTS 3,033,686   5/1962   Landfried et al. _____ 99—91
3,216,829   11/1965  Hansen _____ 99—118

A. LOUIS MONACELL, *Primary Examiner.*

RAYMOND N. JONES, M. W. GREENSTEIN,
*Assistant Examiners.*